March 13, 1956  F. E. FINLAYSON ET AL  2,737,737
COMBINATION DRY AND STEAM FLATIRON
Filed Jan. 21, 1954
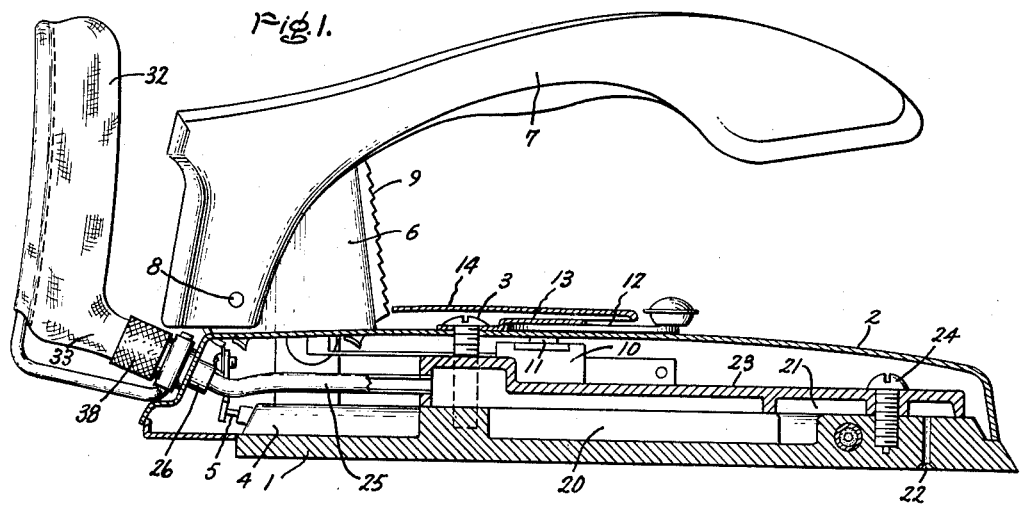
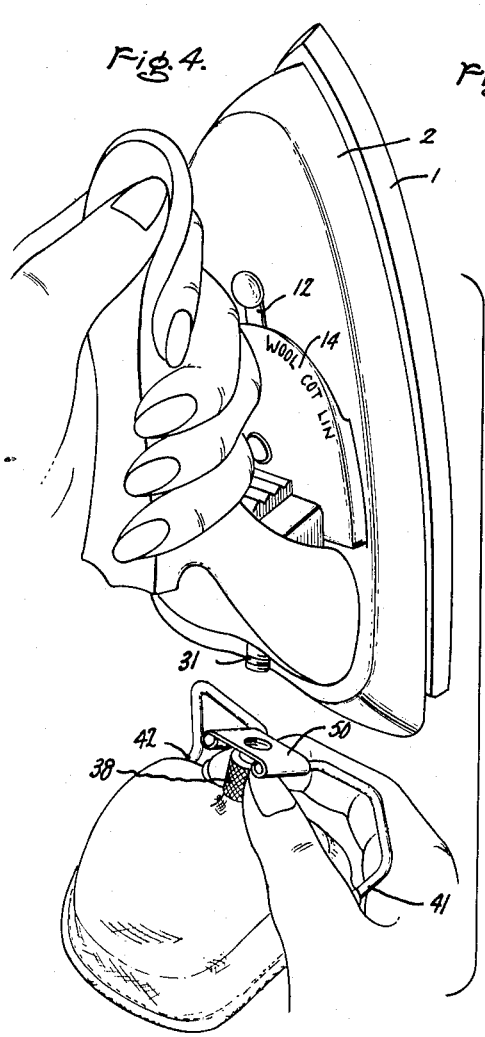
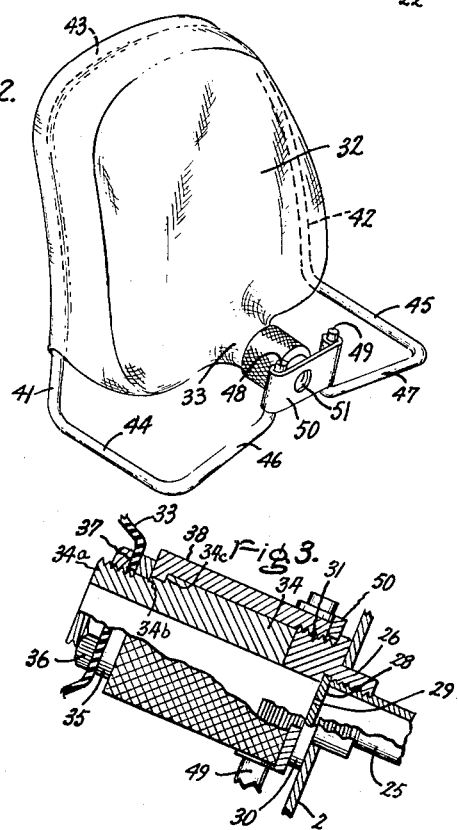
Inventors
Frank E. Finlayson
Bryce A. Denton
by Frank L. Neuman
Their Attorneys

United States Patent Office 2,737,737
Patented Mar. 13, 1956

2,737,737

COMBINATION DRY AND STEAM FLATIRON

Frank E. Finlayson and Bryce A. Denton, Ontario, Calif., assignors to General Electric Company, a corporation of New York Application January 21, 1954, Serial No. 405,375

5 Claims. (Cl. 38—77)

The present invention relates to electric flatirons of the type which are so constructed that they may be used either as a dry flatiron or as a steam flatiron. It is especially well adapted for use in small flatirons such as the so-termed "travel" flatirons, although it is not limited necessarily to flatirons of this particular type.

The object of the invention is to provide an electric flatiron which may be used as a dry flatiron and in combination therewith simple inexpensive means whereby it may be used as a steam flatiron.

According to one embodiment of the invention, a flatiron is provided with a steam chamber in which steam is generated for steam ironing, and water is supplied to the steam chamber through a water pipe to the outer end of which a water reservoir, preferably in the form of a non-self-supporting collapsible bag, is detachably connected, the flow path from the reservoir to the steam chamber including walls which define a water metering orifice. The bag may be carried by and supported on a suitable frame which may function also as a heel rest upon which the flatiron may be upended. The bag may be formed from suitable water-impervious material such as a rubberized cloth; and since it is non-self-supporting no air vent is required in it; and when empty it collapses so that it occupies but little space.

In the drawing, Fig. 1 is a longitudinal sectional view of a flatiron embodying the invention, the flatiron shown being of the so-termed "travel" type having a pivoted handle which may be folded down onto the top wall of the flatiron cover.

Fig. 2 is a detail perspective view of a frame and water reservoir carried thereby.

Fig. 3 is a detail sectional view of a coupling.

Fig. 4 is a perspective view illustrating the manner in which the frame and water reservoir may be connected to the flatiron body.

Referring to the drawing, 1 indicates the soleplate of the flatiron and 2 the cover attached to the soleplate by a screw 3. The soleplate and cover together form the body of the flatiron. Cast into the soleplate is a heating unit 4, the terminals of which are indicated at 5. Pivotally mounted on a bracket 6 fixed at the heel end of cover 2 is a handle 7, the pivot being indicated at 8. The handle is held in its up or ironing position by a suitable spring pressed latch 9 carried by bracket 6. When the latch is pushed rearwardly the handle is released to permit of its being lowered down onto the top wall of cover 2. This latching arrangement is not part of our invention but is described in detail and claimed in Patent 2,727,322 issued on December 20, 1955, to Alfred G. Swenson, and assigned to the assignee of the present invention. The flatiron may be provided with a suitable adjustable thermostat for controlling its temperature. A thermostat structure is indicated at 10, it being provided with a shaft 11 which projects out through an opening in cover 2 and has an adjusting lever 12 on its outer end. Lever 12 is shown as being held on the shaft end by a spring plate 13 fixed in place under the head of screw 3. At 14 is a dial plate suitably attached to cover 2 for indicating the setting of the thermostat adjusting lever. The specific structures of the flatiron parts so far referred to form no part of the present invention. For this reason, they have been shown only generally and in outline. They are to be taken as typical of any suitable such flatiron parts. Also details of the wiring for the flatiron are not illustrated as suitable wiring arrangements are known and form no part of the present invention.

My invention has to do with a construction and arrangement in a flatiron of the type described whereby it embodies means adapting it to be used as a steam flatiron.

On soleplate 1 are walls which define a steam chamber 20 connected by suitable steam distributing passages 21 to a number of orifices in the soleplate, one of which is shown at 22 in Fig. 1, through which steam generated in the steam chamber is discharged onto the surface being ironed. Steam chamber 20 and passages 21 are covered by a plate 23 held in place by a suitable number of studs one of which is shown at 24. Connected to the rear end wall of plate 23 is a water supply pipe 25 for the steam chamber. The outer end of supply pipe 25 is held in the end wall of cover 2 by a fitting 26 (see Fig. 3). The end of pipe 25 is threaded into the fitting and between the pipe end and a shoulder in the fitting is a disk 28 having a metering orifice 29 for controlling flow of water through pipe 25 to a steam chamber 20. Fitting 26 has an integral flange 30 which fits against the outer surface of the end wall of cover 2 and beyond that a threaded nipple 31. Thus it will be seen that the threaded nipple is positioned outside the end wall of the cover. That is, it is positioned at the heel end of the flatiron.

For supplying water through water supply pipe 25 to steam chamber 20 there is provided a non-self-supporting collapsible bag 32 carried by a wire frame which in addition to supporting the bag functions also as a heel rest for the flatiron when it is being used as a steam flatiron. Bag 32 may be made from a suitable water-impervious flexible and collapsible material such as rubberized cloth for example. It has a neck 33 at what may be termed its lower end. Neck 33 is fastened to a fitting through which the bag may be connected to nipple 31 on the flatiron. The bag fitting is shown as comprising a short tube 34 having a threaded end 34a of reduced diameter and two stepped shoulders 34b and 34c. Positioned against shoulder 34b is a washer 35 between which and a nut 36 on the threaded tube end is held inturned end 37 of bag neck 33. Washer 25 and shoulder 34c cooperate to provide an annular groove in which is positioned an inturned flange on one end of a coupling sleeve 38, the other end of the coupling sleeve being threaded internally for screwing onto nipple 31. The inturned flange on coupling sleeve 38 fits the annular groove loosely so it may be turned therein and the sleeve is knurled on its outer surface so it may be turned readily with the fingers.

Bag 32 is roughly triangular in outline and at its rear side is attached to a supporting frame comprising two side bars 41 and 42 connected by a top crossbar 43. The bag may be attached to the frame by flaps along its rear edges which are sewed or cemented around the bars of the frame. Thus the bag is positioned on the front side of the frame. At their lower ends side bars 41 and 42 are provided with forwardly extending arms 44 and 45 provided with inturned extensions 46 and 47 having upturned ends 48 and 49 to which is fastened an anchoring plate 50 having a central opening 51 in line with fitting coupling sleeve 38, the opening 51 being large enough to permit of nipple 31 extending through it. As best shown in Fig. 3, when the bag and frame are attached to the flatiron body by threading coupling sleeve 38 onto nipple 31, plate 50 is clamped between the end of sleeve 38 and flange 30. This supports the bag and frame on the rear end of the flatiron body as shown in Fig. 1. Also the end of tube 34 is held against the outer end of nipple 31 to provide a water tight seal between the tube and the fitting 26.

When the flatiron is to be used for steam ironing, the bag is filled with water through coupling sleeve 38 and tube 34 after which the bag is attached to the flatiron by threading sleeve 38 on the nipple 31. This may be done conveniently after the manner suggested by Fig. 4, the flatiron being held in a vertical position with one hand and the bag and frame being attached to it with the other hand. In attaching the bag and frame, nipple 31 is passed through opening 51 in plate 50 and coupling sleeve 38 then threaded onto it. While this is shown as a threaded coupling it will be apparent that other types of couplings, for example the bayonet type, could be used if desired. The flatiron is then ready for steam ironing. Since bag 32 is non-self-supporting, i. e., collapsible, no air vent opening is required in order for water to be fed from it to the flatiron. As shown in Fig. 1, the arrangement is such that the bag neck and coupling slope downwardly somewhat when the flatiron is horizontal so water will flow readily from the bag to the flatiron. At any time while steam ironing, the flatiron may be upended on the bag frame thus bringing the neck of the bag to a vertical position to stop flow of water from the bag to the flatiron.

When the invention is embodied in a "travel" steam flatiron and the flatiron is to be readied for packing, the bag may be removed, any water left in it poured out, and the frame with the bag collapsed against it nested alongside the flatiron body in which position it will occupy but little space.

For dry ironing the flatiron will be used ordinarily with the bag detached although it may be used with the bag attached providing there is no water in the bag.

An important feature of the invention resides in the use of a non-self-supporting collapsible water supply bag, as such a bag can be readily and easily attached to the flatiron body, can be provided at low cost and when empty occupies but little space. And a further advantageous feature of the invention resides in the use of a frame for supporting the bag which frame serves also as heel rest upon which the flatiron may be upended. Such a frame may be bent up from a suitable rod or wire, the bag is easily attached to it and it can be provided at low cost.

What we claim as new and desire to secure by Letters Patent of the United States is:

1. In a steam flatiron, a flatiron body having walls forming a steam chamber therein, a conduit through which water is supplied to the steam chamber, the outer end of said conduit being located at the heel end of the flatiron body, and means for supplying water to said conduit comprising a non-self-supporting collapsible water holding bag, a frame on which the bag is supported, said frame being supported on said body and coupling means for connecting the bag to said conduit and for attaching said frame to said body, said frame being shaped to provide a support upon which the flatiron may be upended.

2. The combination with a steam flatiron having a nipple at its heel end through which water is supplied to the flatiron, means for supplying water to the nipple comprising a frame having forwardly extending arms, means for connecting the ends of said arms to the flatiron body with the frame in spaced relation to the heel end of the flatiron and extending generally parallel thereto, a water reservoir carried by the frame between the frame and the heel of the flatiron, and means for connecting the reservoir to said nipple, said frame being shaped to provide a heel rest upon which the flatiron may be upended.

3. The combination with a steam flatiron having a nipple at its heel end through which water is supplied to the flatiron, of means for supplying water to the nipple comprising a frame having forwardly extending arms, an anchor plate connecting the outer ends of said arms, said anchor plate having an opening through which said nipple projects, a water reservoir carried by the frame between it and the heel end of the flatiron, and a fastening member for connecting the water reservoir to said nipple and clamping said anchor plate against the flatiron body.

4. The combination of claim 3 wherein said anchor plate includes two spaced loops, one on each side of said opening, and said ends of said arms are received within said spaced loops.

5. In an electric flatiron having a soleplate, walls which define a steam chamber within the flatiron, and ports in the soleplate to which steam is supplied from the steam chamber, means for supplying water to the steam chamber comprising a water pipe having its inner end connected to the steam chamber and its outer end positioned at the surface of the flatiron, a water reservoir of flexible and collapsible material, means for supporting said flexible water reservoir to permit collapse as water drains therefrom, a single detachable coupling means connecting the reservoir to the outer end of said water pipe, fastening means on the outer end of said water pipe onto which the detachable coupling means is secured, such outer end of said water pipe forming the sole support for said water reservoir, and walls which define a metering orifice in the flow path for water from the reservoir to the steam chamber.

References Cited in the file of this patent

UNITED STATES PATENTS

| | | |
|---|---|---|
| 2,237,381 | Wallace | Apr. 8, 1941 |
| 2,284,411 | Fielding | May 26, 1942 |
| 2,433,556 | Hume | Dec. 30, 1947 |
| 2,620,576 | Stevenson et al. | Dec. 9, 1952 |